US009990658B2

(12) United States Patent
Stiernagle

(10) Patent No.: US 9,990,658 B2
(45) Date of Patent: Jun. 5, 2018

(54) RETAIL LOCATION ROBOTIC WALL SYSTEM

(71) Applicant: BBY SOLUTIONS, INC., Richfield, MN (US)

(72) Inventor: Chad Stiernagle, Eagan, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days. days.

(21) Appl. No.: 15/222,505

(22) Filed: Jul. 28, 2016

(65) Prior Publication Data

US 2017/0039607 A1    Feb. 9, 2017

Related U.S. Application Data

(63) Continuation of application No. 14/973,239, filed on Dec. 17, 2015, now Pat. No. 9,430,788, which is a
(Continued)

(51) Int. Cl.
| | |
|---|---|
| *G06F 7/00* | (2006.01) |
| *G06Q 30/06* | (2012.01) |
| *G07F 9/02* | (2006.01) |
| *G07F 11/16* | (2006.01) |
| *B25J 11/00* | (2006.01) |

(Continued)

(52) U.S. Cl.
CPC ........ *G06Q 30/0601* (2013.01); *B25J 11/008* (2013.01); *G06Q 10/087* (2013.01); *G06Q 20/18* (2013.01); *G07F 9/023* (2013.01); *G07F 11/165* (2013.01); *Y10S 901/02* (2013.01)

(58) Field of Classification Search
None
See application file for complete search history.

(56) References Cited

U.S. PATENT DOCUMENTS

| | | |
|---|---|---|
| 4,270,319 A | 6/1981 | Spasojevic |
| 4,530,549 A | 7/1985 | Genna |
| | (Continued) | |

FOREIGN PATENT DOCUMENTS

| | | |
|---|---|---|
| CA | 1252430 A | 4/1989 |
| DE | 3941754 A1 | 6/1991 |
| | (Continued) | |

OTHER PUBLICATIONS

U.S. Appl. No. 13/472,532, filed May 16, 2012, Retail Location Robotic Wall System.
(Continued)

*Primary Examiner* — Yolanda R Cumbess
(74) *Attorney, Agent, or Firm* — Schwegman Lundberg & Woessner, P.A.

(57) ABSTRACT

A robotic retail wall is presented allowing for the dispensing of merchandise within a retail location. The robotic wall includes commodity products and robotics that pick and deliver products to consumers in response to input at a kiosk. The robotics and products are separated from a retail space by a transparent barrier, allowing consumers in the retail space to view the actions of the robotics in retrieving a product. Behind the robotic wall is a product stocking area, where commodity products can be added to the robotic wall with assistance from the robotics.

22 Claims, 5 Drawing Sheets

Related U.S. Application Data continuation of application No. 13/472,532, filed on May 16, 2012, now Pat. No. 9,230,387.

(60) Provisional application No. 61/489,918, filed on May 25, 2011.

(51) Int. Cl.
  *G06Q 10/08* (2012.01)
  *G06Q 20/18* (2012.01)

(56) References Cited

U.S. PATENT DOCUMENTS

| | | |
|---|---|---|
| 4,567,359 A | 1/1986 | Lockwood |
| 4,591,070 A | 5/1986 | Wirstlin |
| 5,206,814 A | 4/1993 | Cahlander et al. |
| 5,362,197 A | 11/1994 | Rigling |
| 5,544,996 A | 8/1996 | Castaldi et al. |
| 5,595,263 A | 1/1997 | Pignataro |
| 5,720,547 A | 2/1998 | Baird |
| 5,822,216 A | 10/1998 | Satchell, Jr. et al. |
| 5,838,566 A | 11/1998 | Conboy et al. |
| 5,893,697 A | 4/1999 | Zina et al. |
| 5,927,544 A | 7/1999 | Kanoh et al. |
| 6,059,092 A | 5/2000 | Jerue et al. |
| 6,064,921 A | 5/2000 | Pippin et al. |
| 6,210,093 B1 | 4/2001 | Hannen et al. |
| 6,321,138 B1 | 11/2001 | Livesay |
| 6,360,904 B1 | 3/2002 | Schilb et al. |
| 6,393,339 B1 | 5/2002 | Yeadon |
| 6,424,111 B1 | 7/2002 | Romig |
| 6,490,502 B2 | 12/2002 | Fellows |
| 6,535,790 B2 | 3/2003 | Nakano et al. |
| 6,547,096 B1 | 4/2003 | Chirnomas |
| 6,584,375 B2 | 6/2003 | Bancroft et al. |
| 6,609,047 B1 | 8/2003 | Lipps |
| 6,688,451 B2 | 2/2004 | Derby et al. |
| 6,694,217 B2 | 2/2004 | Bloom |
| 6,842,665 B2 | 1/2005 | Karlen |
| 6,962,267 B2 | 11/2005 | Herzog et al. |
| 7,039,495 B1 | 5/2006 | Conboy et al. |
| 7,203,570 B2 | 4/2007 | Karlen |
| 7,261,511 B2 | 8/2007 | Felder et al. |
| 7,364,050 B2 | 4/2008 | Guard |
| 7,381,022 B1 | 6/2008 | King |
| 7,444,204 B2 | 10/2008 | Chirnomas |
| 7,530,473 B2 | 5/2009 | Chirnomas |
| 7,536,283 B2 | 5/2009 | Potter et al. |
| 7,621,108 B1 | 11/2009 | Brastauskas et al. |
| 7,780,392 B2 | 8/2010 | Rogers et al. |
| 7,787,681 B2 | 8/2010 | Zhang et al. |
| 7,809,470 B2 | 10/2010 | Shoenfeld |
| 7,896,243 B2 | 3/2011 | Herskovitz |
| 7,967,543 B2 | 6/2011 | Criswell et al. |
| 7,988,015 B2 | 8/2011 | Mason, II et al. |
| 8,078,316 B2 | 12/2011 | Blust et al. |
| 8,092,140 B2 | 1/2012 | Baker et al. |
| 8,140,187 B2 | 3/2012 | Campbell et al. |
| 8,162,174 B2 | 4/2012 | Hieb et al. |
| 8,175,925 B1 | 5/2012 | Rouaix |
| 8,204,624 B2 | 6/2012 | Zini et al. |
| 8,239,062 B2 | 8/2012 | Vahlberg et al. |
| 8,281,553 B2 | 10/2012 | Kim |
| 8,308,414 B2 | 11/2012 | Schifman et al. |
| 8,374,967 B2 | 2/2013 | Chirnomas |
| 8,403,614 B2 | 3/2013 | Bastian, II et al. |
| 8,417,380 B2 | 4/2013 | Kuehnrich et al. |
| 8,494,672 B2 | 7/2013 | Chirnomas |
| 8,494,673 B2 | 7/2013 | Miranda et al. |
| 8,562,277 B2 | 10/2013 | Criswell |
| 8,571,700 B2 | 10/2013 | Keller et al. |
| 8,571,701 B2 | 10/2013 | Lunak et al. |
| 8,571,708 B2 | 10/2013 | Rob et al. |
| 8,620,472 B2 | 12/2013 | Mockus et al. |
| 8,632,294 B2 | 1/2014 | Subotincic |
| 8,678,232 B2 | 3/2014 | Mockus et al. |
| 8,695,814 B2 | 4/2014 | Van et al. |
| 8,705,388 B2 | 4/2014 | Gong et al. |
| 8,706,293 B2 | 4/2014 | Lu |
| 8,712,586 B2 | 4/2014 | Allinson |
| 8,738,177 B2 | 5/2014 | Van et al. |
| 8,768,789 B2 | 7/2014 | Smith et al. |
| 8,935,002 B2 | 1/2015 | Ho |
| 9,132,975 B2 | 9/2015 | Criswell |
| 9,224,137 B1 | 12/2015 | Tomasi et al. |
| 9,230,387 B2 | 1/2016 | Stiernagle |
| 9,428,336 B2 | 8/2016 | Hagen et al. |
| 9,430,788 B2 | 8/2016 | Stiernagle |
| 9,520,012 B2 | 12/2016 | Stiernagle |
| 2003/0120387 A1 | 6/2003 | Sherwin |
| 2004/0059463 A1 | 3/2004 | Coughlin |
| 2004/0071539 A1 | 4/2004 | Anater, Jr. et al. |
| 2004/0191032 A1 | 9/2004 | Foulke et al. |
| 2005/0055361 A1 | 3/2005 | Deal |
| 2005/0063801 A1 | 3/2005 | Durand et al. |
| 2005/0143857 A1 | 6/2005 | Chirnomas |
| 2005/0216120 A1 | 9/2005 | Rosenberg et al. |
| 2005/0238465 A1 | 10/2005 | Razumov |
| 2006/0045674 A1 | 3/2006 | Craven |
| 2006/0182604 A1 | 8/2006 | Clark et al. |
| 2007/0071585 A1 | 3/2007 | Henkel |
| 2008/0008568 A1 | 1/2008 | Harris et al. |
| 2008/0122615 A1 | 5/2008 | Shoenfeld |
| 2008/0284139 A1 | 11/2008 | Shockley |
| 2009/0005905 A1 | 1/2009 | Kuehnrich et al. |
| 2009/0164328 A1 | 6/2009 | Bishop et al. |
| 2009/0312864 A1 | 12/2009 | Hanel |
| 2010/0017296 A1 | 1/2010 | Spignesi, Jr. et al. |
| 2010/0121481 A1 | 5/2010 | Talley et al. |
| 2010/0138037 A1 | 6/2010 | Adelberg et al. |
| 2010/0234990 A1 | 9/2010 | Zini et al. |
| 2011/0071928 A1 | 3/2011 | Young |
| 2011/0153071 A1 | 6/2011 | Claessen et al. |
| 2011/0172815 A1 | 7/2011 | Kim |
| 2011/0229296 A1 | 9/2011 | van Ooyen et al. |
| 2012/0029685 A1 | 2/2012 | Keller et al. |
| 2012/0029687 A1* | 2/2012 | Hagen ............... B65G 1/0407 700/218 |
| 2012/0033209 A1 | 2/2012 | Osterkamp et al. |
| 2012/0101627 A1 | 4/2012 | Lert |
| 2012/0104785 A1 | 5/2012 | Hixson et al. |
| 2012/0136477 A1 | 5/2012 | Morrow et al. |
| 2012/0219397 A1 | 8/2012 | Baker |
| 2012/0298688 A1 | 11/2012 | Stiernagle |
| 2012/0303154 A1 | 11/2012 | Stiernagle |
| 2013/0123978 A1 | 5/2013 | Stark et al. |
| 2013/0253700 A1 | 9/2013 | Carson et al. |
| 2013/0297066 A1 | 11/2013 | Alvern |
| 2014/0052498 A1 | 2/2014 | Marshall et al. |
| 2014/0100769 A1 | 4/2014 | Wurman et al. |
| 2014/0212250 A1 | 7/2014 | Wolter |
| 2016/0104220 A1 | 4/2016 | Stiernagle |
| 2017/0076267 A1 | 3/2017 | Stiernagle |

FOREIGN PATENT DOCUMENTS

| | | |
|---|---|---|
| EP | 0169156 A1 | 1/1986 |
| JP | 61150908 A | 7/1986 |
| WO | WO-2009065145 A1 | 5/2009 |
| WO | WO-2012019189 A2 | 2/2012 |

OTHER PUBLICATIONS

U.S. Appl. No. 14/973,239, filed Dec. 17, 2015, Retail Location Robotic Wall System.
U.S. Appl. No. 13/562,744, filed Jul. 31, 2012, Retail Location Robotic Wall System and Mobile Retail Sales Vehicle.
"U.S. Appl. No. 13/472,532, Non Final Office Action dated Apr. 17, 2015", 7 pgs.
"U.S. Appl. No. 13/472,532, Notice of Allowance dated Nov. 12, 2015", 6 pgs.
"U.S. Appl. No. 13/472,532, Notice of Non-Compliant Amendment dated Feb. 24, 2015", 2 pgs.

(56) References Cited

OTHER PUBLICATIONS

"U.S. Appl. No. 13/472,532, Response filed Feb. 3, 2015 to Restriction Requirement dated Dec. 3, 2014", 6 pgs.

"U.S. Appl. No. 13/472,532, Response filed Mar. 23, 2015 to Notice of Non-Compliant Amendment dated Feb. 24, 2015", 6 pgs.

"U.S. Appl. No. 13/472,532, Response filed Oct. 15, 2015 to Non Final Office Action dated Apr. 17, 2015", 8 pgs.

"U.S. Appl. No. 13/472,532, Restriction Requirement dated Dec. 3, 2014", 5 pgs.

"U.S. Appl. No. 13/562,744, Restriction Requirement dated Oct. 6, 2015", 7 pgs.

"U.S. Appl. No. 14/973,239, Notice of Allowance dated Apr. 27, 2016", 11 pgs.

"U.S. Appl. No. 14/973,239, PTO Response to Rule 312 Communication dated May 9, 2016", 2 pgs.

"U.S. Appl. No. 14/973,239, Supplemental Preliminary Amendment filed Jan. 26, 2016", 11 pgs.

"U.S. Appl. No. 14/973,239, Preliminary Amendment filed Dec. 17, 2015", 4 pgs.

"B. Small Goods Storage, B6. Miniload single store", (r) Copyright 2008, (2008), 3 pgs.

"B. Small Goods Storage, B6. Miniload Multi-Store", (r) Copyright 2008, (2008), 3 pgs.

"Clerk? What's a clerk?", Lancaster Newspapers. Inc, (Oct. 31, 2002).

"Everything-Robotic", The Robot Report, (Oct. 2, 2012).

"Kroger debuts kiosk concept at area college campus", The Blade, (Feb. 15, 2012).

"Robotic Grocery Stores Pop Up Nationwide", Enterprise Efficiency, (Apr. 5, 2012).

"The End of Separation: Man and Robot as Collaborative Coworkers on the Factory Floor", Shelf Plus, (Aug. 8, 2013).

Murray, Charles J, "Now There's a Robot", Design News, (Mar. 26, 1990), 78.

"U.S. Appl. No. 13/562,744, Notice of Allowance dated Oct. 21, 2016", 5 pgs.

"U.S. Appl. No. 15/362,428, Non Final Office Action dated Oct. 6, 2017", 7 pgs.

"U.S. Appl. No. 15/362,428, Preliminary Amendment filed Nov. 28, 2016", 5 pgs.

"U.S. Appl. No. 15/362,428, Response filed Jan. 3, 2018 to Non Final Office Action dated Oct. 6, 2017", 9 pgs.

"U.S. Appl. No. 15/362,428, Supplemental Preliminary Amendment filed Jan. 5, 2017", 8 pgs.

* cited by examiner

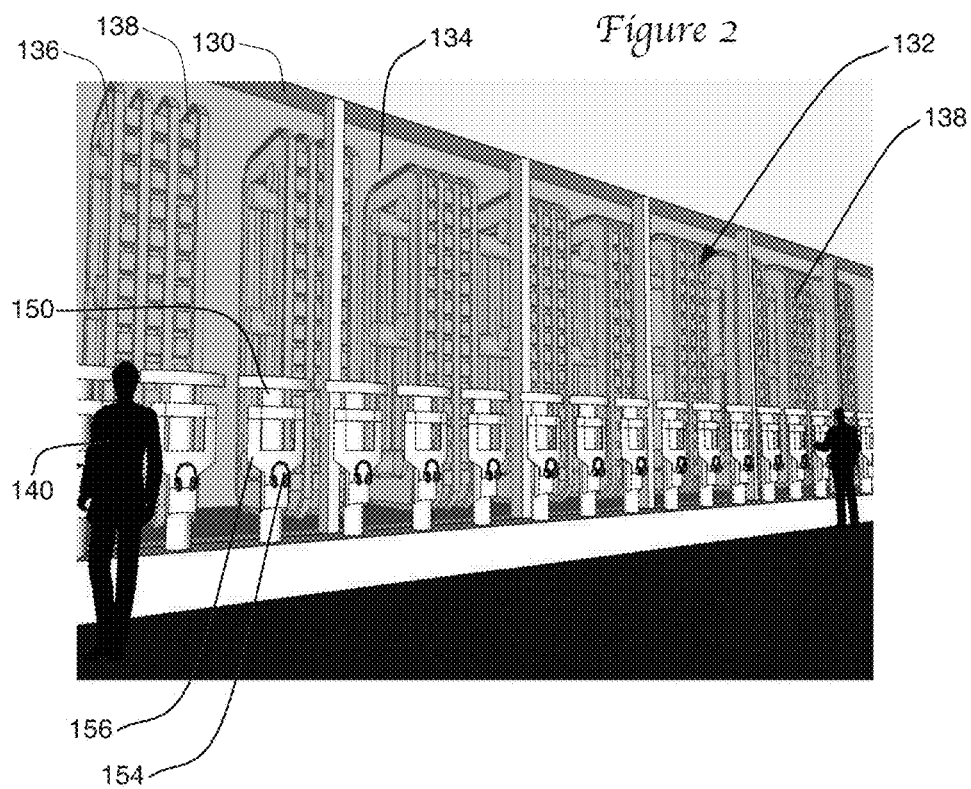
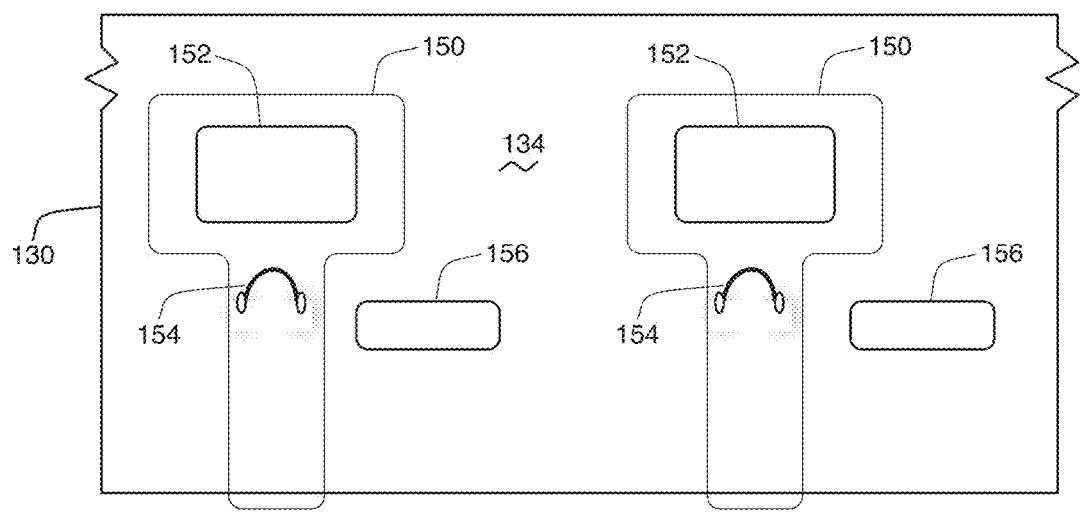

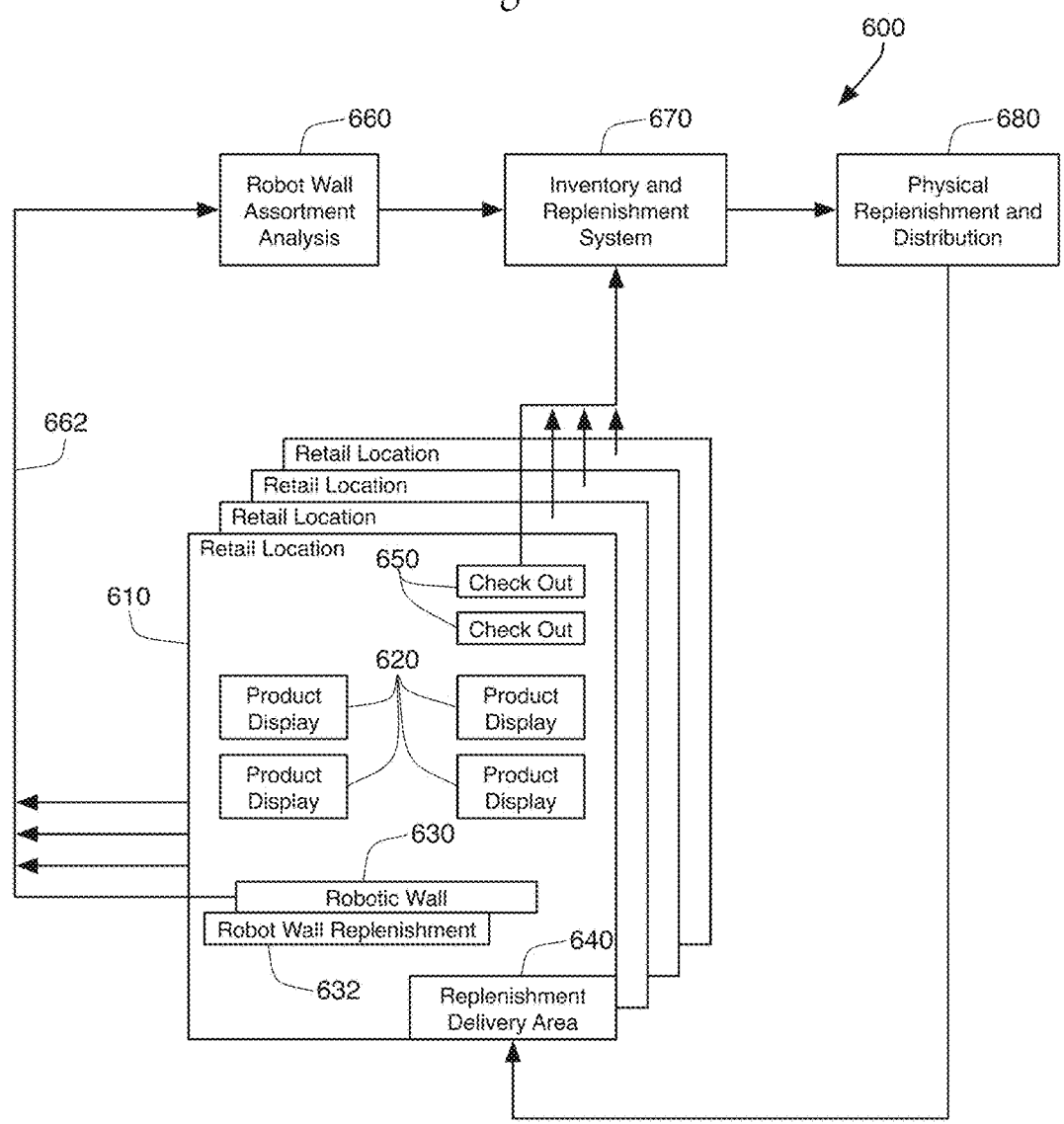

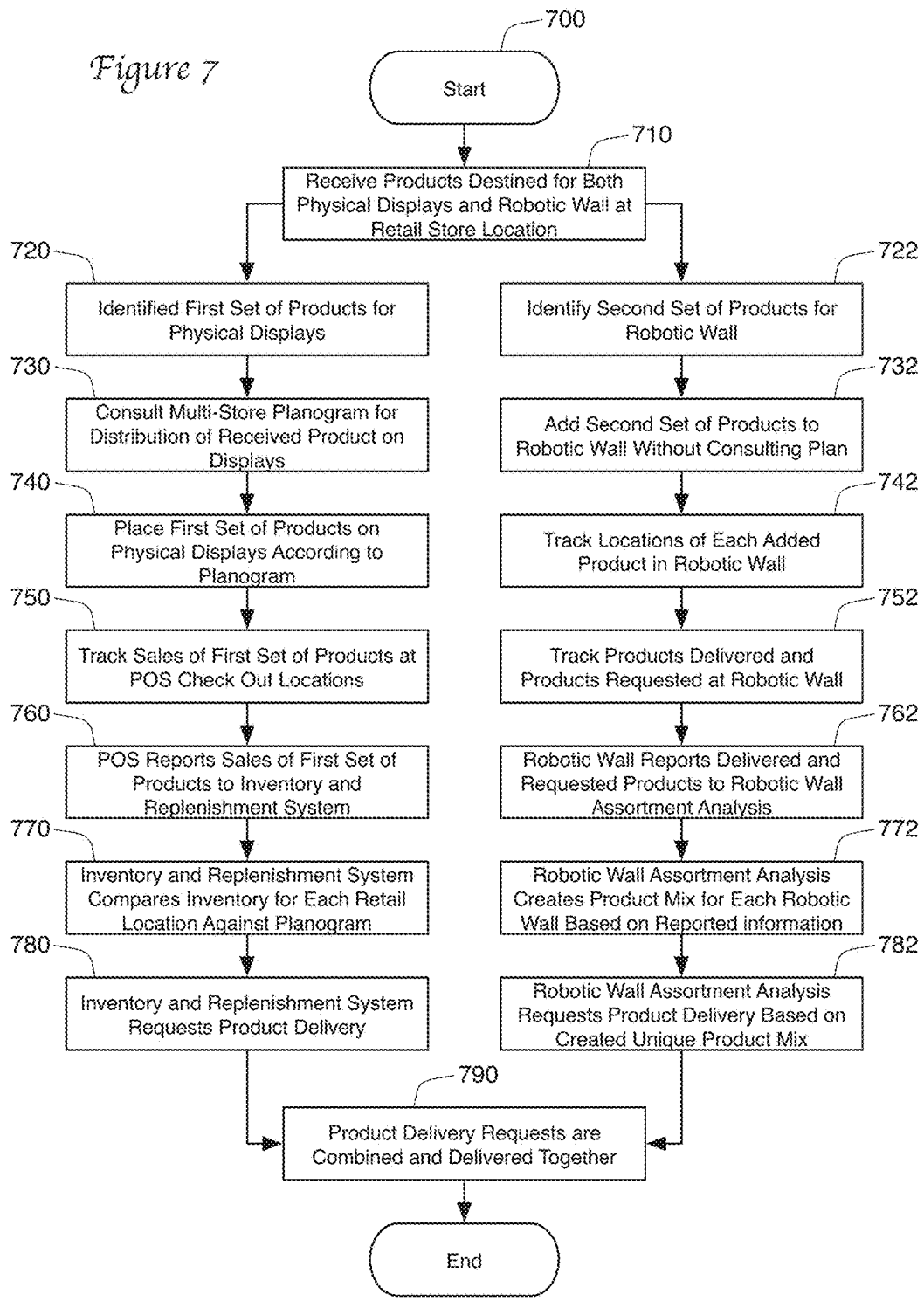

US 9,990,658 B2

RETAIL LOCATION ROBOTIC WALL SYSTEM

RELATED APPLICATION

The present application is a continuation of U.S. patent application Ser. No. 14/973,239, filed Dec. 17, 2015, which is a continuation of U.S. patent application Ser. No. 13/472,532, filed May 16, 2012, which claims the benefit of U.S. Provisional Application Ser. No. 61/489,918, filed May 25, 2011, which applications are hereby incorporated by reference.

FIELD OF THE INVENTION

The present application relates to the field of physical retail sales locations. More particularly, the described embodiments relate to a robotic wall implemented in a retail store location to dispense and sell commodity products.

BRIEF DESCRIPTION OF THE DRAWINGS

FIG. 2 is a perspective drawing of one embodiment of a robotic wall using kiosks.

FIG. 3 is a view of a kiosk according to one embodiment.

FIG. 6 is a schematic view of a replenishment system involving a plurality of retail locations using a robotic wall.

FIG. 7 is a flow chart showing a method for replenishing retail locations that use a robotic wall.

DETAILED DESCRIPTION

Figure 1:
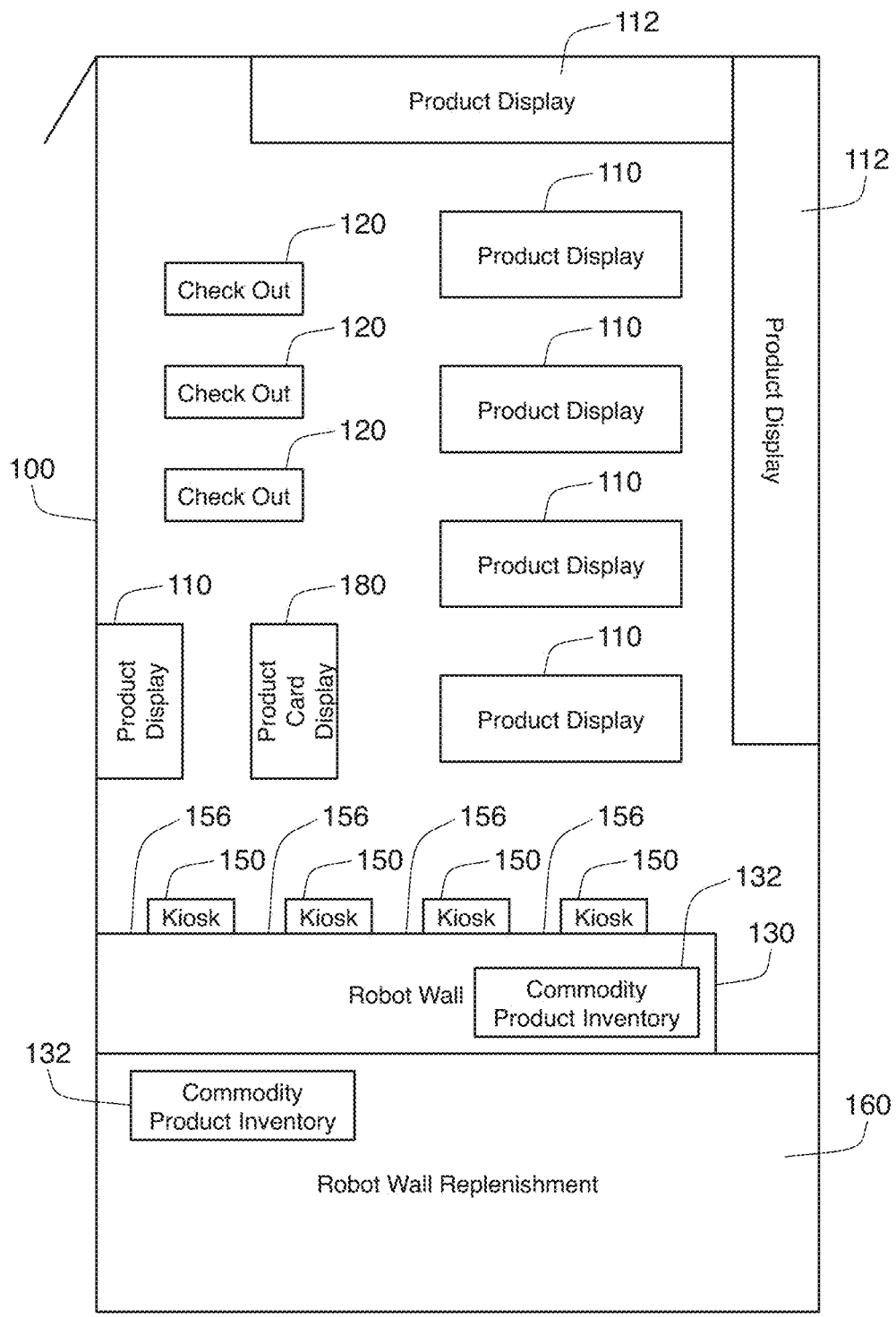
FIG. 1 is a schematic diagram of a retail sales location utilizing one embodiment of a robotic wall.

FIG. 1 shows a retail location 100 such as an electronics store. The retail location 100 includes a variety of product displays 110 and 112 in which products are displayed to customers. Product displays 110 are free-standing units, while product displays 112 are designed to be located against a wall of the retail location 100. Customers that are interested in a product can remove the product from the displays 110 or 112 and bring the product to a checkout location 120 for purchase. In order to allow customers to help themselves to merchandise, the product displays 110-112 generally keep all products within easy reach of the customer. Thus, even though a retail location may have a wall height of 15-20 feet or higher, product displays 110-112 generally do not place products higher than six or seven feet.

Like most retailers, electronic retailers sell commodity, low-margin products as well as higher-margin products. For instance, CDs, DVDs, Blu-ray disks, and video games are low-margin, commodity-type products for an electronics store, while televisions and appliances that may be sold with service plans are higher-margin products. It can be difficult to properly allocate limited product display locations 110-112 between these two different types of goods. While it is tempting to reduce the display locations 110-112 allocated to commodity-type products, customers frequently visit a retail location 100 in order to purchase the commodity product. Thus the retail location 100 must make the purchase experience for commodity products at least as inviting as for the higher margin products. An electronics store that reduces product display space for music, movies, and games in order to display more televisions and appliances risks reducing customer visits to the store location 100. Furthermore, if the commodity products are displayed in a less desirable location in the store, or in a more compact and crowded environment, the customer may also choose to shop for such goods elsewhere.

In the retail location 100 shown in FIG. 1, commodity product inventory 132 such as movies, games, and music are stored and dispensed from a robotic wall 130. While a portion of commodity product inventory 132 is displayed in robotic wall 130, a portion may also be hidden from view in robot wall replenishment area 160. Kiosks 150 are located along robot wall 130 to allow customers to select products from inventory 132. In response to a customer selection, the robot wall 130 retrieves the desired product from inventory 132 and dispenses it to the customer at product delivery area 156.

An example of a robotic wall 130 is shown in FIG. 2. Commodity products are located behind a transparent wall 134 in the robotic wall 130. Robotics 136 select particular products 138 as desired by a customer 140 who interacts with the robotic wall 130 through a plurality of kiosks 150. Robotic wall 130 takes advantage of the otherwise underutilized vertical aspect of the retail location 100. Inventory 132 can be densely packed within the robotic wall 130, allowing the robot wall 130 to hold more products 138 per square foot of floor space. Because the entire height of a wall can be used to store inventory 132, the retail location 100 can carry a much greater selection of commodity products 138 than would otherwise be possible. Furthermore, because the products 138 are densely packed and stored vertically up the wall, the retail location 100 is able to free valuable floor space for high-margin products or for otherwise improving the retail shopping experience. It is estimated that in a traditional retail location, it would be possible to redeploy seventy percent of the space in a retail location 100 currently allocated to commodity products by use of the robotic wall 130. It would even be possible to shrink the retail location size 100 while still carrying the same inventory of products. In the preferred embodiment, the robotic wall 130 is greater than ten feet tall, perhaps reaching fifteen or twenty feet tall. Since the robotic wall 130 can extend along a wall, the preferred embodiment may be twenty feet long or longer.

FIG. 3 shows an embodiment of kiosks 150. The kiosks 150 are spaced evenly along the length of the robotic wall 130. In the preferred embodiment, multiple kiosks 150 are present, allowing many customers 140 to use robot wall 130 simultaneously. In FIG. 3, only two kiosks 150 are shown, but the preferred embodiment includes at least five and perhaps dozens of kiosks 150 for a single robotic wall, such as shown in FIG. 2. Each kiosk 150 may contain a visual display 152 and a headset 154. The kiosk 150 will also include a user input device, such as a touch screen 152 that allows the user to enter queries and make selections on the kiosk 150. Although it is not shown in FIG. 3, it is within the scope of the present invention to include keyboards, mice, and other input devices to facilitate user interaction with the kiosks 150. In the preferred embodiment, a product delivery area 156 is located in or near each kiosk 150. The product delivery area 156 may be a hole in the transparent barrier 134 that divides the main retail space of the retail location 100 from the interior of the robotic wall 130. The product delivery area 156 may include a conveyor or trap doors to move the select product from the reach of the robotics 136 to the reach of the consumers 140. Care should be taken when constructing the product delivery area 156 to prevent a consumer 140 from reaching into the interior of the robotic wall 130 both to prevent theft of products 138 and to prevent injury to the consumer 140.

Figure 4:
FIG. 4 is a visual display for browsing commodity products.

The kiosks 150 can be designed to allow the consumer 140 to browse the products 138 available in the commodity product inventory 132. FIG. 4 shows an example of a visual display 152 designed to make browsing for commodity products 138 interesting. Headsets 154 and displays 152 allow customers 140 to fully preview movie, music, and even gaming products at the kiosks 150. Preferably, the kiosks 150 have connectivity to the Internet, allowing the customer 140 to learn more information about the products 138 and to compare one product to another. In one embodiment, this connectivity is limited to a particular website, such as a website run by the retailer that provides the retail location 100. In other embodiments, connectivity is allowed to major media review sites, or even full Internet access. In addition, the visual display 152 of a kiosk 150 may allow the consumer 140 to express requests for products 138 that are not currently in inventory 132. The request can be a simple request that the product 138 be stocked in the robotic wall 130 at this location, or the request can include a request to purchase the products 138 and have the purchased products shipped to the retail location 100 or directly to the consumer 140.

Because wall 134 is transparent, customer 140 can see the robotics spring into action. By allowing robotics 136 to pick the products 138 and place the products in front of the consumer 140 at the kiosk 150, the robotic wall 130 creates a visually exciting retail experience. Consumers approach the robotic wall 130 to see the products 138 and the robotics 136. This visual robotic motion will attract attention from shoppers in the retail location 100, thereby increasing shopper excitement.

In one embodiment the kiosks 150 can be designed to receive payment, such as through credit or debit cards, gift cards, or cash. In this embodiment, a product 138 is not dispensed from the robotic wall 130 until payment has been received for the product 138. Alternatively, the robotic wall 130 can be used merely to dispense products, with the actual purchase taking place at traditional checkout locations 120 in the retail location 100. Regardless of whether payment is required before a product 138 is dispensed, the use of a robotic wall 130 should reduce theft, or "shrink," of commodity products, as the products themselves will not be accessible to customers who are only browsing through the inventory.

Restocking of the commodity product inventory 132 in the robotic wall 130 takes place behind the robotic wall 130. In FIG. 1, the restocking takes place in the robotic wall replenishment area 160. This can be a room behind the robotic wall 130 that can be used both for replenishment and for storage. In the preferred embodiment, replenishment area 160 is hidden from view and cannot be seen through the robot wall 130. Ideally, the robotics 136 in the robotic wall 130 will be used to help replenish the inventory retained in the wall 130. When a product 138 is added to the robotic wall 130, the robotics 136 can scan and identify the product, and record its location for later retrieval when identified by a consumer.

Figure 5:
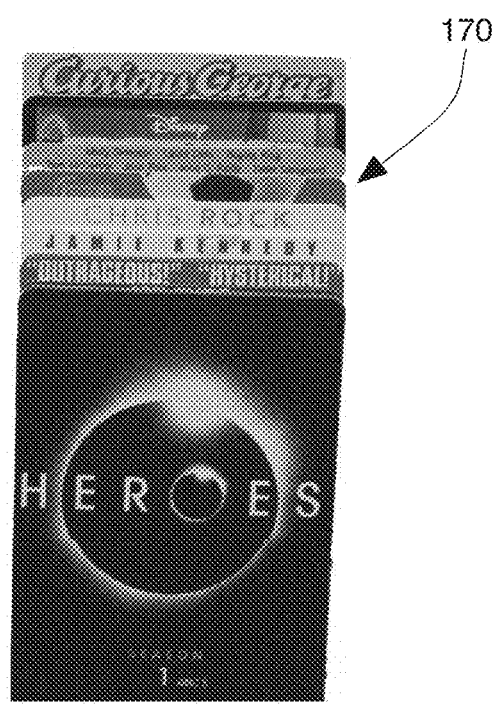
FIG. 5 is a plan view of a plurality of product cards.

In another embodiment, product cards, such as cards 170 shown in FIG. 5, can be used by customers 140 to select products 138 stored in the robot wall 130. Product cards 170 contain pictures and descriptions for the commodity products 138. Products 138 generally provide information on their packaging related to the contents of the product 138. Product cards 170 may contain information similar or identical to the information available on the packaging of products 138. This allows customers to have close to the same shopping experience that they had before the use of the robotic wall 130, as product cards 170 can be sorted and provided to the customer much like the products 138 themselves. The product cards 170 can contain a bar code or other identifier that can be read by the kiosk to identify the product 138 to the robotics 136. This embodiment allows customers to bypass the step of searching for products 138 at the visual display 152 of kiosk 150.

As shown in FIG. 1, it is possible to locate a product card display area 180 near the robotic wall 130. Because the cards are much slimmer than the actual products 138, the amount of the retail location 100 dedicated to displaying commodity products 138 is still greatly reduced (by as much as a factor of 22). Thus a retail location 100 can still allow physical browsing and present a much larger inventory 132 for the customer 140 while reducing the floor space dedicated to commodity products and shrink associated with product theft. Of course, it would be possible to still have certain products 138 on display in the retail location 100, allowing grab-and-go shopping for customers for the latest releases of music, movies, or games.

FIG. 5 shows a system 600 in which numerous retail locations 610 have implemented normal product display apparatuses (such as shelves, end caps, and island displays) 620 along with a robotic wall 630. In most retailers, the product mix that is displayed on the display apparatuses 620 are governed by a planogram. A planogram is a plan that determines the amount and location of product that will be displayed in the store, the layout and mix of the physical product display apparatuses 620, as well as the location of the products on each of the product displays 620. Most retailers design their retail locations 610 to be similar, such that numerous retail locations 610 will have similar or identical product display configurations. These similar locations 610 are then usually governed by a single planogram, such that a first retail location 610 will have the same product mix displayed in on the same product displays 620 as the next location 610. While some minor variations may be permitted between retail locations, large retailers prefer to have multiple locations 610 to use the same planogram. Other retailers have a variety of store formats (e.g., small, medium, and large retail locations). Each of these formats would have a separate planogram, but individual stores within the format are expected to use the same planogram. One obvious disadvantage of using a universal planogram over a variety of retail locations is that it is difficult or impossible to change the products being displayed and sold from one location to the next. To allow some variations, some retailers allocate a portion of the store to regional preferences. Frequently, the remainder of the store uses a universal planogram, and even the regional portion will likely be subject to a pre-defined planogram for that region.

To replenish products that are sold at a location 610, products are delivered to and received at the store's replenishment delivery area 640. This area may include truck loading docks, back room storage, and inventory locations. To restock the store shelves, employees of the location receive products from the delivery area 640, and then consult the planogram for the product displays 620. The planogram will set forth the exact location of each product to be stocked on the product displays 620 of the retail locations. Unfortunately, while this process is common to all retail stores, the requirement that the displays 620 must be restocked according to the planogram for that display greatly increases the time required to restock inventory at the retail location.

One benefit of the robotic walls 130, 630 is that replenishment of the wall does not take place according to a planogram. Because users select products in the robotic wall 130 through the displays 152 of the kiosks 150, there is no need for the product inventory 132 of the wall 130 to be maintained in a uniform matter.

As shown in FIG. 6, products received at the retail location's replenishment delivery area 640 that are destined for the robotic wall 630 are added to the wall 630 through the replenishment system or area 632 behind (or beside) the wall 630. Since the products in the wall 630 are selected by users through kiosks and extracted and delivered through robotics, products can be added randomly to the wall inventory as long as the robotics track the location of each product added to the wall 630. Consequently, when products are added through the robot wall replenishment system 632, the robotics of the wall 630 receive the product, store the product in the inventory of the wall 630, and then track the location of that product within the inventory. When a user requests that product, the robotics will recall that location, and then select the product and deliver it to the user at the appropriate product delivery area.

When a product in the robotic wall 630 is delivered to a customer through a product delivery area in the wall 630, the robotic wall 630 notes that the product is no longer in its inventory. This information is shared with a remote computerized system 660 that analyzes the inventory and assortment of the products in the robotic wall 630. Communication with the remote system 660 takes place over a computerized network 662 such as the Internet. To facilitate this communication, both the robot wall assortment analysis computer system 660 and the robotic wall 630 contain network interfaces to communicate over this network. In the preferred embodiment, the network 662 is a TCP/IP network and the network interfaces include hardware and software components necessary to implement a TCP/IP protocol stack.

The remote system 660 comprises one or more server computers operating to receive data from a plurality of robotic walls 630 at a plurality of retail locations 610. These server computers 660 include a set of software instructions or interfaces stored on a non-volatile, non-transitory, computer readable medium such as a hard drive or flash memory device. A digital processor, such as a general purpose CPU manufactured by Intel Corporation (Mountain View, Calif.) or Advanced Micro Devices, Inc. (Sunnyvale, Calif.), accesses and performs the software. To improve efficiency, the processor may load software stored in memory into faster, but volatile RAM. The software operates on data, such as the inventory and delivery data received from the robotic walls 630. This data is stored in non-volatile memory and retrieved into RAM for analysis, recording, and reporting.

Data related to customer product delivery and product replenishment in the robotic walls 630 at the plurality of retail locations 610 is delivered to system 660 for analysis. In addition, the robotic walls 630 may allow customers to express requests for products that are not currently in inventory at the wall 630. These requests are also forwarded to system 660. The system 660 analyzes this data and determines an ideal product assortment for each individual robotic wall 630. If a first wall 630 sells more romantic comedy DVDs than the second wall 630, and the second wall 630 sells more "M" rated video games than the first wall 630, the system 660 will note the different desires of the customers at each wall 630 and change the assortment of products stored in inventory at the walls 630 to reflect these different desires.

This store-by-store differentiation of products in the walls 630 differs from the assortment of products presented to customers in the product displays 620, as the product displays 620 are all governed by a planogram that covers multiple retail locations 610. The products in the display 620 are purchased by customers at one or more check out (Point-of-Sale or POS) devices 650. These POS devices 650 read bar codes or other indicators off of the items purchased, total the purchases, accept payments, and print receipts for customers. The multiple POS devices 650 in a retail location 610 typically are networked together to a POS server not shown) at the retail location 610, which then communicates sales data to a remote inventory and replenishment server system 670. This server system 670 is configured much like system 660, in that it consists of one or more computers with processors, non-volatile memory, RAM, network interfaces, software, and data. The inventory and replenishment system 670 accepts data from the POS devices 650 at a plurality of store locations 610 and uses this information to track inventory at the stores 610.

When the inventory for particular products is running low relative to the expect inventory in the governing planogram, the system 670 will request that additional product be sent to that store. Typically a system of distribution warehouses hold inventory that can be delivered to stores on an as-needed basis through a trucking distribution network. When products need to be delivered to a particular retail location 610, the inventory and replenishment system 670 will request that the physical replenishment and distribution system 680 will supply those products to that location 610. The physical replenishment and distribution system 680 may comprise its own server to receive network communications from the inventory replenishment system 670 and advise the warehouses and trucks on the delivery of the appropriate products to the retail locations 610. The distribution system server would also be configured like systems 670 and 660. In other embodiments, the functions of the distribution system server and the inventory and replenishment server 670 could be combined into a single server system that combines the functionality of both servers. When the physical replenishment and distribution system delivers products to the retail locations 610 through its distribution system (such as via trucks delivering goods from warehouses), the products are received at the replenishment delivery area 640 and distributed throughout the store location 610 as described above.

In one embodiment, the robot wall assortment analysis system 660 utilizes the existing product ordering and delivery system that is used by the retail locations 610 to maintain inventory in the product displays 620. In this embodiment, when the robot wall assortment analysis system 660 determines that additional products should be delivered to a robotic wall 630 at a retail location, it sends a request to the inventory and replenishment system 670 to add the necessary products to the next product delivery to that retail location 610. This communication can take place via computer-to-computer network messaging, such as a secure message passing over the Internet. The inventory and replenishment system 670 adds the additional products as requested to the next delivery, and the physical replenishment and distribution system 680 delivers these products destined to the robotic wall 630 to the replenishment deliver area 640 of that retail location 610.

In this way the robotic wall 630 for each location 610 can have a unique assortment of products based on the user interactions with the wall 630 at that location even though the product assortment on display on displays 620 remains governed by a multi-store planogram. At the same time, product replenishment for the wall 630 is controlled by a separate system 660, which itself integrates the actual product delivery to the location 610 with the main replenishment system that delivers products for physical product displays 620.

FIG. 7 shows a flow chart of a method 700 for replenishing retail locations that use a robotic wall. In step 710, products are received at a retail location 610. The products may be received at a replenishment delivery area 640 and include a first set of products destined for physical product displays 620 and a second set of products destined for a robotic wall 630. In step 720 the first set of products for physical displays are identified, and in step 722 the second set of products for the robotic wall are identified. The first and second set of products are each handled in a different but parallel manner. For the first set of products, a multi-store planogram is consulted in step 730 to determine where the first set of products should be distributed within the retail space 610. In step 740 the first set of products are displayed on physical product displays 620 according to the planogram. As the products on physical product displays 620 are sold, the product sales are tracked at step 750 at Point of Sale (POS) check out locations 650. Sales data from the POS are reported to an inventory replenishment system 670 in step 760. The sales data may be sent to the replenishment system 670 immediately as products are sold, or the POS may collect sales data and send the data to the replenishment system 670 at predetermined intervals, such as once per day.

Once sufficient sales data are collected from POS 650, the inventory and replenishment system 670 determines in step 770 which products in the first set of products for physical displays 620 need to be distributed to retail location 610. Replenishment system 670 accomplishes this task by comparing the actual inventory in the retail location 610 with the multi-store planogram. Because the planogram is standardized from store to store, the replenishment system merely compares the number of products in store inventory to the number of products required by the planogram. In step 780 the inventory and replenishment system 670 makes a request for product from the physical replenishment and distribution system 680.

In contrast to the method used for the first set of products, the products destined for the robotic wall 630 are identified in step 722, then added to the robotic wall 630 in step 732 without consulting a planogram. The robotic wall 630 is responsible for assigning locations to each product. Because the robotic wall 630 does not require a planogram, the costs associated restocking products and with designing and administering planograms for a retail location 610 are diminished. In step 742 the location of each product added to robotic wall 630 is tracked. The robot wall system 630 is designed so that, although the physical location of each product within robot wall 630 may be arbitrary, the products can be located by the tracking system of the wall 630 and retrieved immediately upon demand. Each product may be identified at several different points at the retail location 610. The products, may be tracked when they enter the robot wall replenishment area 632, when they are transferred from area 632 to robotic wall 630, when they are delivered from the robotic wall 630 to a consumer, and when they are purchased at a POS 650. In step 752, the method tracks products that are delivered and products that are requested by consumers at the robotic wall 630. Step 752 allows the system to aggregate data regarding consumer demand for products. In particular, the number of units sold and units requested for a given product may be used to improve product selection for the robotic wall 630 at retail location 610.

In step 762 data regarding delivered products and requested products are collected from the robotic wall 630 and reported to the robot wall assortment analysis system 660. In step 772 the assortment analysis system 660 uses data from each individual retail location 610 to create a customized product selection mix for each location 610 based on actual past product sales and product requests for each location. The reported information is used to Optimize product selection on a store-by-store basis. In step 782 the robotic wall assortment analysis system 660 sends a request for the unique product mix to the inventory and replenishment system 670.

After the first set of requested products for physical display and the second set of requested products for the robot wall are determined, at step 790 the product delivery requests are combined together and sent as a single request to the physical replenishment and distribution system 680. Step 790 simplifies the product replenishment process. The physical replenishment and distribution system 680 does not require separate orders, saving time and labor costs.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A robotic inventory system, comprising:
a storage unit, wherein the storage unit is adapted to host product bins in respective storage locations along a height, width, and depth of a storage area, and wherein the product bins are shaped and sized to host respective instances of a plurality of products;
a robotics unit operable to access the product bins from the respective storage locations in the storage area; and
a robotic control system to control the robotics unit, the robotic control system including:
a tracking system, the tracking system operable to track respective storage locations of the product bins within the storage unit, wherein the respective instances of the products hosted in the product bins within the storage unit are associated with product identifiers in the tracking system; and
a command system operable to control the robotics unit in response to a command to stock an instance of a product or retrieve the instance of the product from the storage unit, the command including a product identifier of the product, the command to stock causing the robotics unit to place a product bin containing the instance of the product at a position in the storage unit, and the command to retrieve causing the robotics unit to move the product bin from the position in the storage unit to a product dispensing location;
wherein the tracking system is further operable to track respective storage locations of the products within the storage unit based on an association of respective product identifiers of the products with the respective storage locations within the height, width, and depth of the storage area;

wherein the robotic control system operates to stock the respective instances of the products within the storage unit among the respective storage locations independently of a planogram; and wherein the plurality of products are stocked by the robotics unit throughout the respective storage locations in the storage unit to provide mixed stocking locations of different products associated with different product identifiers within the height, width, and depth of the storage area.

2. The robotic inventory system of claim 1, wherein the storage unit is a three-dimensional rack providing a plurality of storage cells for hosting the product bins along the height, the width, and the depth of the storage unit, and wherein the robotic control system operates to stock multiple products of the plurality of products with respective storage bins hosted along the depth of a particular storage cell of the plurality of storage cells.

3. The robotic inventory system of claim 2, wherein the storage unit establishes a wall in a retail environment.

4. The robotic inventory system of claim 1, wherein the robotics unit is further operable to retrieve the respective instances of the products within the storage unit by retrieval of the product bins from the respective storage locations, wherein the respective instances of the products are accessed using the respective product identifiers.

5. The robotic inventory system of claim 1, further comprising:
a scanner to scan a particular product item instance of the respective instances of the products to be added to the storage unit, wherein the particular instance is identified and recorded for later retrieval based on information obtained with the scan.

6. The robotic inventory system of claim 5, wherein the robotic control system further operates to track, with the tracking system, a particular storage location in the storage unit of the particular instance, to enable later retrieval of the particular instance by retrieval of a product bin at the particular storage location in the storage unit.

7. The robotic inventory system of claim 1, wherein the tracking system is further adapted to determine the respective storage locations of the respective product items, instances of the products wherein the respective storage locations of the respective instances of the products are determined based on characteristics independent of a planogram, and wherein the respective storage locations of the respective instances of the products are determined based on inventory characteristics of a product mix of the respective instances of the products in the storage area.

8. The robotic inventory system of claim 1, further comprising:
a replenishing unit to receive additional instances of the products of the plurality of products, the replenishing unit being accessible by the robotics unit, wherein the replenishing unit allows loading of the additional instances of the products for stocking by the robotics unit into the storage unit.

9. The robotic inventory system of claim 8, further comprising:
a barrier to prevent unauthorized access to the storage area, wherein the barrier is located on a first side of the storage area to restrict access to the storage unit, and wherein the replenishing unit is located on a second side of the storage area.

10. The robotic inventory system of claim 8, wherein the stocking of the additional instances of the products occurs to place product bins hosting the additional instances of the products in open storage areas of the storage unit, and wherein initial storage operations for the product bins in the storage area are performed based on a predetermined organization independent of a planogram.

11. The robotic inventory system of claim 1, further comprising:
an electronic system comprising a user interface to receive respective commands to initiate selection and delivery of a requested product using the robotic control system, wherein the respective commands cause the robotics unit to retrieve and deliver a selected product instance corresponding to the requested product.

12. The robotic inventory system of claim 1, further comprising:
the product dispensing location, the product dispensing location adapted to receive and dispense the respective instances of the products to a particular customer, in response to retrieval of respective product bins from the storage unit that host the respective instances of the products.

13. The robotic inventory system of claim 12, further comprising:
a plurality of dispensing locations for retrieval of the respective instances of the products by respective customers, wherein the plurality of dispensing locations includes the product dispensing location.

14. The robotic inventory system of claim 12, wherein the respective instances of the products are removed from an inventory maintained by the tracking system in response to dispensing the respective instances of the products to the particular customer at the product dispensing location.

15. A method, performed by programmed electronics of a robotic inventory system, the robotic inventory system including a storage unit, a robotics unit, a robotic control system, and a tracking system, the method comprising:
stocking respective instances of a plurality of products within the storage unit using the robotics unit, wherein the robotics unit operates to stock product bins containing the respective instances among respective storage locations along a height, width, and depth of a storage area defined by the storage unit, and wherein the product bins are shaped and sized to host the respective instances of the plurality of products;
tracking respective storage locations of the product bins within the storage unit, wherein the respective instances of the products hosted in the product bins within the storage unit are associated with product identifiers in the tracking system; and
controlling the robotics unit in response to a command to stock an instance of a product or retrieve the instance of the product in the storage unit, the command including a product identifier of the product, the command to stock causing the robotics unit to place a product bin containing the instance of the product at a position in the storage unit, and the command to retrieve causing the robotics unit to move the product bin from the position in the storage unit to a product dispensing location;
wherein the tracking system is further operable to track respective storage locations of the products within the storage unit based on an association of respective product identifiers of the products with the respective storage locations within the height, width, and depth of the storage area;
wherein the robotic control system operates to stock the respective instances of the products within the storage unit among the respective storage locations independently of a planogram; and wherein the plurality of products are stocked by the robotics unit throughout the respective storage locations in the storage unit to provide mixed stocking locations of different products associated with different product identifiers along the height, width, and depth of the storage area.

16. The method of claim 15, the method further comprising:
scanning and identifying a particular instance of the respective instances of the products to be added to the storage unit, wherein the particular instance is identified and recorded for later retrieval based on information obtained with the scanning and identifying.

17. The method of claim 15, the method further comprising:
generating a user interface to receive respective commands to initiate selection and delivery of a requested product using the robotic control system; and
controlling the robotics unit in response to the respective commands to cause the robotics unit to retrieve and deliver a selected instance corresponding to the requested product.

18. The method of claim 17, further comprising:
performing transactions to remove the respective instances of the products from an inventory maintained by the tracking system in response to dispensing the respective instances of the products, wherein dispensing of the respective instances of the products occurs in response to success of an electronic transaction with an electronic payment processing system to effect payment of the requested instances of the products.

19. At least one non-transitory machine-readable storage medium, comprising a plurality of instructions performed by programmed electronics of a robotic inventory system, for a robotic inventory system including a storage unit, a robotics unit, a robotic control system, and a tracking system, wherein the instructions, responsive to being executed with processor circuitry of a machine, cause the machine to perform operations that:
cause the robotics unit to stock respective instances of a plurality of products within the storage unit using the robotics unit, wherein the robotics unit operates to stock product bins containing the respective instances among respective storage locations along a height, width, and depth of a storage area defined by the storage unit, and wherein the product bins are shaped and sized to host the respective instances of the plurality of products;
cause the tracking system to track respective storage locations of the product bins within the storage unit, wherein the respective instances of the products hosted in the product bins within the storage unit are associated with product identifiers in the tracking system; and
cause the robotics unit to access the storage unit in response to a command to stock an instance of a product or retrieve the instance of the product from the storage unit, the command including a product identifier of the product, the command to stock causing the robotics unit to place a product bin containing the instance of the product at a position in the storage unit, and the command to retrieve causing the robotics unit to move the product bin from the position in the storage unit to a product dispensing location;

wherein the tracking system is further operable to track respective storage locations of the products within the storage unit based on an association of respective product identifiers of the products with the respective storage locations within the height, width, and depth of the storage area;

wherein the robotic control system operates to stock the respective instances of the products within the storage unit among the respective storage locations independently of a planogram; and wherein the products are stocked by the robotics unit throughout the respective storage locations in the storage unit to provide mixed stocking locations of different products associated with different product identifiers within the height, width, and depth of the storage area.

20. The machine-readable storage medium of claim 19, wherein the instructions further cause the machine to control the robotic control system, with operations that:
scan and identify a particular instance of the respective instances of the products to be added to the storage unit, wherein the particular instance is identified and recorded for later retrieval based on information obtained by scanning and identifying of the particular instance.

21. The machine-readable storage medium of claim 19, wherein the instructions further cause the machine to control the robotic control system, with operations that:
generate a user interface to receive respective commands to initiate selection and delivery of a requested product using the robotic control system; and
control the robotics unit in response to the respective commands to cause the robotics unit to retrieve and deliver a selected instance corresponding to the requested product.

22. The machine-readable storage medium of claim 21, wherein the instructions further cause the machine to further control the retrieval and delivery of a selected product item, with operations that:
perform transactions to remove the respective instances of the products from an inventory maintained by the tracking system in response to dispensing the respective instances of the products, wherein dispensing of the respective instances of the products occurs in response to success of an electronic transaction with an electronic payment processing system to effect payment of the requested instances of the products.

* * * * *